Figure 1:
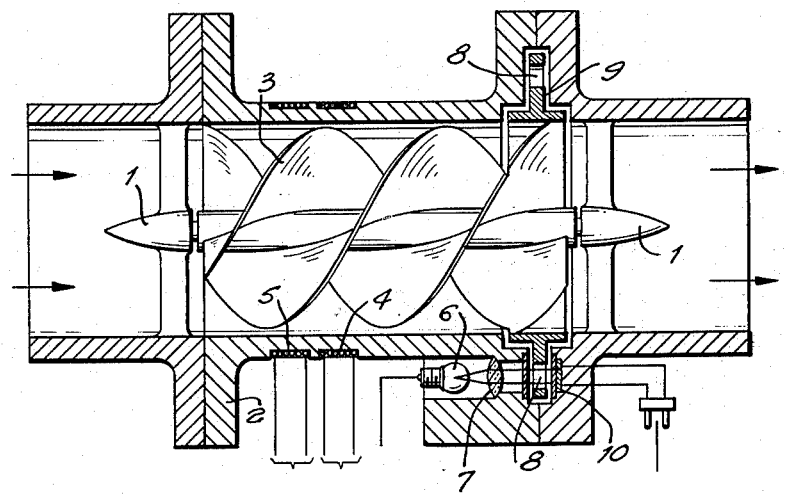

Dec. 30, 1952     T. VAN OOSTEROM     2,623,389
FLOWMETER

Filed July 23, 1948     2 SHEETS—SHEET 1

INVENTOR.
TEUNIS VAN OOSTEROM
BY

Dec. 30, 1952     T. VAN OOSTEROM     2,623,389
FLOWMETER
Filed July 23, 1948                          2 SHEETS—SHEET 2
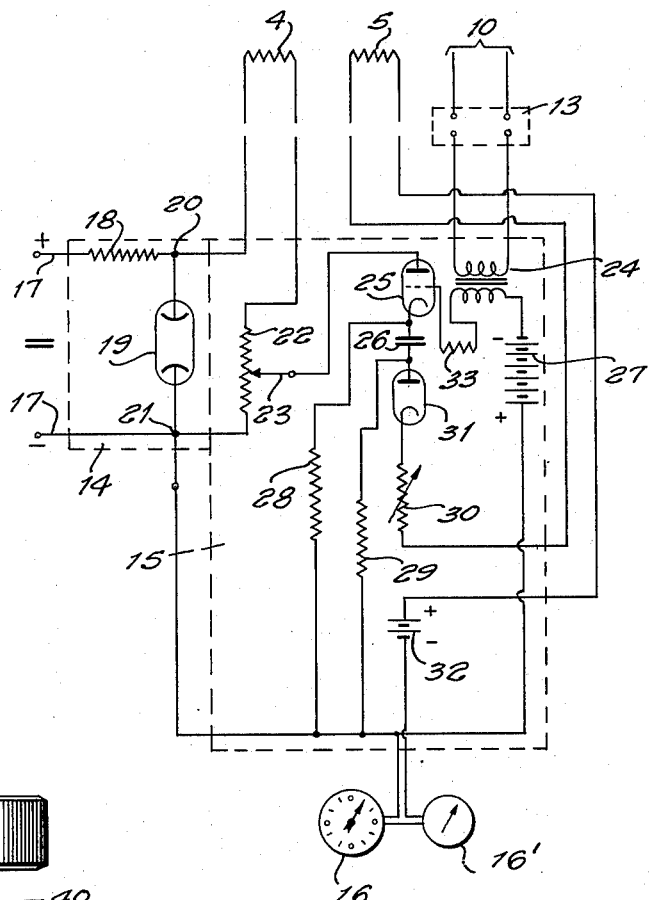
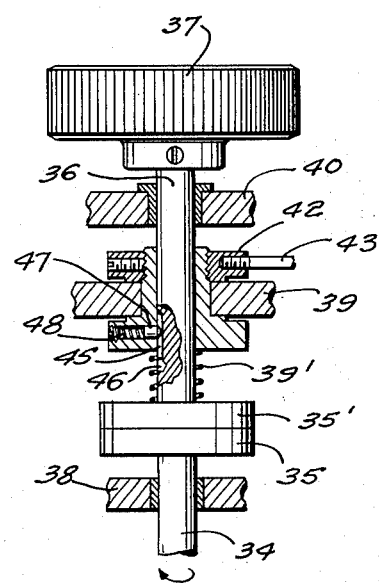
INVENTOR.
TEUNIS VAN OOSTEROM
BY Patented Dec. 30, 1952

2,623,389

UNITED STATES PATENT OFFICE 2,623,389

FLOWMETER

Teunis Van Oosterom, Amsterdam, Netherlands, assignor to het Nationaal Luchtvaartlaboratorium, Amsterdam, Netherlands Application July 23, 1948, Serial No. 40,291
In the Netherlands June 27, 1947

6 Claims. (Cl. 73—231)

1

The invention relates to an apparatus for continuously determining the quantity of liquid or gas flowing through a pipe per unit of time, which apparatus may also be provided with an instrument for recording the quantity of liquid or gas, which has run through during a certain period.

Measuring apparatus for this purpose are known in widely varying forms of execution.

Thus, for example, Venturi meters and measuring flanges, gauged in volume/unit of time, may be mentioned, which, however, present the difficulty of not being sufficiently accurate at low velocities of flow and are also less suitable for being built-in in pipes of small diameter.

Another form of apparatus, the Autosyn flowmeter of the Pioneer Instruments Cy., is more specially designed for measuring the consumption of motorfuel for airplanes. It consists of a circularly bent and conically diverging pipe, in which can move a light vane. The position of this vane is determined by the velocity of the flow of the liquid through the meter and the force of a spring, acting upon the vane, in a direction opposite to the flow of the liquid. However, this form of apparatus is very sensible to impurities in the liquid and also to the presence of dirt in the bearings supporting the vane.

The disadvantage of the known forms of apparatus is that the indications are accurate only at a certain temperature of the flowing medium. In fact the forces acting upon the measuring element are a function of the viscosity and of the specific gravity of the flowing medium and these in their turn depend upon its temperature.

The object of the present invention is to provide a construction, which eliminates the above mentioned disadvantages. It is designed, amongst others, for directly and continuously measuring the consumption of motor fuel in airplanes, but may serve in general for measuring the quantity of liquid or gas flowing through a pipe per unit of time and also, if provided with a suitable totalizing instrument, for determining the quantity of liquid or gas, which has run through during a certain period.

A direct indication of the fuel consumption in airplane engines is essential for the pilot, as it permits him to adjust the controls of the engine or engines in such a way, that it works (they work) as economically as possible under the prevailing flying conditions without endangering the security, such as may be the case with other controlling methods. Furthermore the direct indication of the fuel consumption forms a satisfying and immediate indication of many forms of engine defects.

Due to safety considerations it is not permitted to install the fuel supply line of the engines in such a way that a consumptionmeter can be built-in within easy reaching distance of the pilot. One is, therefore, forced to use measuring systems with indication at a distance, which, naturally, must be of low weight, small dimensions and extremely high security. The form of the apparatus according to the present invention fully meets these requirements.

The measuring element built-in in the fuel pipe is of small dimensions, of simple construction, its security is high and it may be built-in in the immediate vicinity of the engine. The remote-indication system, cooperating with the measuring element permits an accurate and inertia free indication of the fuel consumption.

Figure 2:
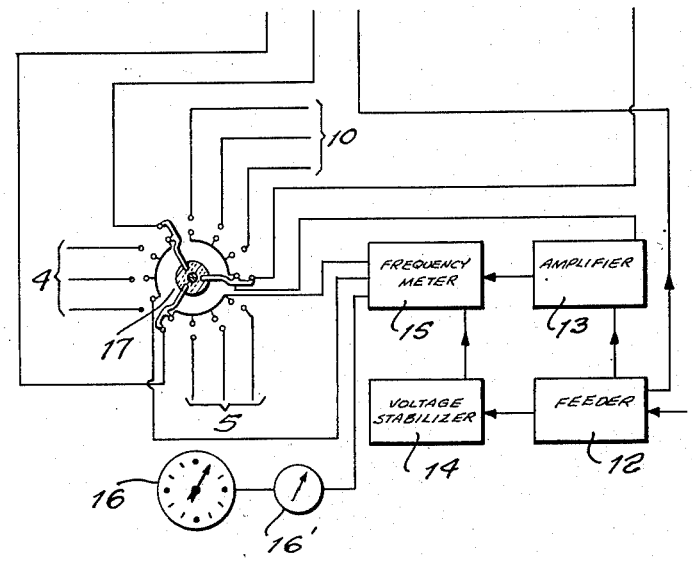

In the accompanying drawing which is given by way of example to show a practical embodiment of a flowmeter according to the invention as applied to the measuring of the fuel consumption in airplane engines:

Fig. 1 is a sectional representation of the measuring element;

Fig. 2 gives a block diagram of the electrical apparatus for the remote-indication system as well as a schematic representation of a change-over switch;

Fig. 3 gives a diagram of one of possible embodiments of the voltage stabilizing apparatus and of the electronic frequency meter equipped with a temperature compensating device.

Fig. 4 shows an embodiment with a continuous control switch.

The flowmeter consists of two main parts, viz. the measuring element and the electrical indication system.

The measuring element (Fig. 1) comprises a tubular casing 2, containing a light helical rotor 3 supported by two bearings 1. Between the rotor and the casing there is provided a slight radial clearance sufficient to secure a free rotation of the rotor. The rotor starts rotating as soon as the medium begins to flow through the instrument.

The rotor is provided with a concentrical flat ring 9, the inner diameter of which corresponds approximately to the inner diameter of the casing. The casing is provided with a suitably formed annular recess for the housing of the ring 9. The ring is provided with a number of similar, evenly spaced holes 8, the centers whereof are located on a circle concentrical with the ring.

On one side of said recess of the casing there is a lighting system, comprising, for example, a small incandescent lamp 6 and a condenser 7, on the other side there is a photoelectric cell 10. The optical axis of the system lamp condenser-photoelectric cell is parallel to the axis of the rotor and meets the center circle of the holes 8.

Thus, as the ring 9 intercepts the rays between the condenser 7 and the photoelectric cell 10, light falls on the photoelectric cell only when there is a hole 8 of the ring between the condenser and the photoelectric cell. Now the ring is fastened to the rotor 3, so that at the rotation of the latter the photoelectric cell 10 receives a number of light impulses per unit of time directly proportional to the velocity of rotation of the rotor. The frequency of these light impulses is a measure for the velocity of the medium current, or for the volume or weight passing the meter per unit of time.

These light impulses are transformed by the photoelectric cell into a periodically varying voltage and fed into the electrical indicating apparatus to be described later on in greater detail, which apparatus is only sensitive to the frequency of the voltage impulses, but unaffected by the magnitude and the wave form of the voltage generated by the photoelectric cell.

The recess in the casing in which the ring 9 rotates, is obviously filled with the medium. Care is taken, however, that the path to be covered by the rays in said medium is as short as possible, in order to prevent impurities or colouring matter, which may be present, from reducing the light energy received by the photoelectric cell to such a degree, that the threshold value of the electric voltage, to which the electrical indication system still responds, would not be reached under unfavourable conditions.

The measuring system is designed in such a way, that impurities do not impede the action thereof. Should, however, the rotor get stuck, the flow continues unimpeded, but with a certain amount of rotating motion due to the immobile rotor and a small loss of pressure of no importance.

At a given temperature of the medium there exists a fixed relation between the velocity of its flow and the velocity of rotation of the rotor. This relation can be determined by gauging, so that the reading apparatus can be provided with a scale valid for a given temperature and a given medium, which apparatus permits an immediate reading of the velocity of flow, or of the quantity by weight or volume flowing through the measuring element per unit of time. For other temperatures of the medium a correction must be applied to the reading, as the specific gravity of the medium as well as the forces acting upon the rotor undergo a change. The latter effect modifies the relation between the velocities of the rotor and the medium, so that a correction is necessary, not only if the instrument is used as a meter for the quantity by weight, but also as a meter for the quantity by volume. Said influence of the temperature can be corrected by means of an automatic compensation. This may be effected, for example, by providing the measuring element with one or two resistors 4 and/or 5 made of a material with a high temperature coefficient or resistivity, which resistors approximately take the temperature of the medium; hereby one or two electric voltages are available depending upon the temperature which, fed into the electronic frequency meter, to be described further on, produce the required compensation. This compensation is a linear or a quadratic function of the temperature and can entirely or substantially neutralize the influence of temperature variations.

The electrical apparatus, an embodiment whereof is shown diagrammatically in Fig. 2, allows remote reading or remote recording of the indications. If more than one measuring elements are used in combination with one single set of electrical apparatus a change-over switch 17 must be provided for, an embodiment whereof is schematically given in Fig. 2. The electrical apparatus comprises a voltage amplifier 13, known per se, combined with an electronic frequency meter 15 also known per se, both of which can be suitably located in the airplane, while the indicating instrument 16 operated by the frequency meter, may be placed in the cockpit on the instrument board. The indicating instrument gives the flow rate either as the velocity of flow or as the volume or weight of the fuel per unit of time. If desired the indicating instrument 16 may be combined with a totalising instrument 16' recording the total volume or weight of the fuel consumed.

The electrical apparatus, which is fed from the electrical net of the plane via a feeder 12, and with which the electronic frequency meter 15 is connected, also comprises a voltage stabilising apparatus 14 whose function is to make the readings independent of fluctuations in the supply voltage as well as of the magnitude and of the wave form of the periodically varying voltage generated by the photoelectric cell.

It is possible to have a continuous control of the fuel consumption of all engines by providing the change-over switch 17 with an automatic driving so that it connects successively the various measuring elements as well as their resistors 4 and 5 with the indication system with a frequency, which is low as compared with the frequency of the voltage impulses received from the photoelectric cell. It may be useful to provide a clutch between the switch and the driving device so as to be able to disconnect them and to connect the switch with any measuring element present for any period of time.

Thus by successively and automatically "feeling" the measuring elements of all the engines the indicating instrument gives successively the respective readings. At equal fuel consumption of all the engines the hand of the indicating instrument keeps indicating a constant unchanging value. If, however, in one or more engines the fuel consumption would change, due for instance to some engine trouble, the hand of the indicating instrument will execute periodic jumps, which will bring the trouble to the attention of the pilot who thereupon can disconnect the change-over switch from its drive and by actuating it by hand can determine which of the engines has trouble and couple this engine with the indicating instrument. Thus only one indicating instrument and one single set of electric apparatus is required, this being important from a point of view of economising weight and space on the dash-board, whereas nevertheless, all possibilities are present, which exist when an indicating instrument is available for each engine.

Fig. 4 of the drawings shows an embodiment of this device. A continuously rotating shaft 34 drives, by means of a friction clutch 35, 35', a shaft 36 provided at its end with a knurled knob 37. The shafts are supported by fixed parts 38, 39 and 40. A part 41, 42 carries the arms of a switch 43. Said part is rotatably mounted in the support 39 and arranged coaxially with the shaft 36 with which it is coupled by means of a groove 45 and a pawl 47 engaged by a spring 48. A helical spring 39' located around the shaft 36 between the part 41 and the flange 35' of the friction clutch provides the necessary contact pressure between 35 and 35'. In the position shown in Fig. 4, the shaft 34 engages by means of the friction clutch the shaft 36 and actuates by means of the pawl 47 and the groove 45 the parts 41, 42 carrying the arms 43 of the switch, said arms rotating with the same angular velocity as the shaft 34. If it is desired to disconnect the switch from the shaft 34 in order to connect it for a certain time with one of the metering elements, it is sufficient to pull the knob 37 in upward direction against the spring 39. By doing so, the clutch 35, 35' is disconnected and the pawl 47, pushed forward by the spring 48, engages the recess 46 provided in the shaft 36, whereby said shaft is arrested in its new position. By rotating the knob 37, it is possible to connect any desired metering element with the electronic apparatus. In order to connect again the switch with the shaft 34, it is sufficient to push the knob 37 in downward direction disengaging in doing so the pawl 47 from its recess 46 and liberating the spring 39.

An embodiment of the voltage stabilizer 14 and the electronic frequency meter 15, both known, are shown in diagram in Fig. 3. In this diagram the compensation circuits are also shown. The voltage stabilizer 14 receives direct current voltage via the terminals 17 from the power supply pack. This voltage is divided over the resistance 18 and the neon lamp 19 in such a way, that a constant voltage is obtained between the terminals 20 and 21 while the voltage on the terminals 17 varies.

The voltage between the terminals 20 and 21 is divided over the compensation coil 4 and the potentiometer 22 in such a way that a definite voltage is obtained at the terminals 21 and 23. When the temperature of the compensation coil 4 is constant and the potentiometer 22 is adjusted in a certain position, a constant voltage is also obtained at the terminals 21 and 23.

By impressing the impulses from the photocell on the grid of a triode 25 via an amplifier 13 and a transformer 24, the capacitor 26 is charged up to the value of the constant voltage at the terminals 21 and 23. The capacitor 26 is connected in the anode current circuit of the triode 25, which acts as an electronic relay. For proper functioning of this relay it is necessary that the battery 27 gives a negative grid bias voltage, in order that the triode 25 has zero current by absence of an impulse from the photocell, whereas the impulse voltage supplied via the amplifier 13 and the transformer 24 has such a magnitude, that the internal resistance of the triode 25 during each impulse becomes so sufficiently low to cause charging of the capacitor 26 up to the value of the voltage between the terminals 21 and 23.

If the apparatus is adjusted as explained above the capacitor 26 will be charged to a fixed voltage, independent of the wave form and magnitude of the impulse voltage.

Another condition for correct functioning of the frequency meter is that the resistors 28 and 29 must have such a value that the capacitor 26 is discharged in the interval between two impulses, during which discharge the triode has a high internal resistance.

If the temperature of the compensation coil 5 remains constant, a fixed part of the charging current of the measuring condenser 26 passes the D. C. ammeter 16 which part depends on the values of the resistors 29, 30 and of the resistance of the compensation coil 5. The rectifier 31 prevents the flow of current in opposite direction through the D. C. ammeter.

The battery 32 prevents the flow of current through the rectifier when no external voltage is impressed on the rectifier anode.

Thus the deflexion of the D. C. ammeter (indicating the average current) is directly proportional to the impulse frequency and therefore with the rotor velocity. Variation of the temperature of the compensation coil 4 causes variation of the fixed value of the capacitor charging voltage.

With variation of the temperature of the compensation coil 5 the part of capacitor charge current that passed through the D. C. ammeter 16 is changed.

The use of one single resistor to correct the influence of the temperature of the fluid to be metered is obviously somewhat limited, since it is practically impossible to design a coil which would exactly compensate the influence of all temperature variations, as the variations in the resistance of the coil and its effect upon the electric current metered by the indicating instrument 16 do not follow in general exactly the influence of temperature on the viscosity and specific gravity of the medium and their influence upon the rotation of the rotor 3.

To achieve good temperature correction over a great range of temperatures two resistors 4 and 5 are used to advantage. It is obvious, that the designer will now have two independent parameters at his disposal instead of one independent parameter, which is the case when only one resistor is used, which will enable him to adapt the corrective action to the characteristics of the apparatus used and of the fluid to be metered, to achieve a good temperature correction over a broad range of temperatures. The variable resistor 30 and the potentiometer 22 being adjustable, a proper measuring range of the meter 16 can be obtained. With these aids this measuring range of the meter can be adapted to any kind of fluid in order to get a maximum sensibility. A totalizing instrument 16' of the ampere-hour meter type may be added in series to the indicating instrument 16 if it is desired to know the total volume or weight of the fluid which has flowed through the meter.

I claim:

1. An apparatus for metering the flow of a fluid, comprising in combination, a conduit carrying the flow of the fluid; propeller means arranged in said conduit for actuation by the flow of the fluid; a photoelectric device; a light source illuminating said photoelectric device; a shutter mechanism actuated by said propeller means and interposed between said light source and said photoelectric device so as to illuminate said photoelectric device periodically at a rate proportional to the rate of the flow of the fluid through said conduit; an electronic frequency meter including a one-way electronic relay connected to said photoelectric device so as to yield an electric current output proportional to the frequency of interruptions by said shutter of the light emitted by said light source and falling on said photoelectric device; a device of the direct current ammeter type for metering the current output of said relay; a circuit applying the current output of said relay to said current metering device; and a temperature sensitive resistor inserted in series in said circuit and arranged with respect to said conduit so as to have substantially the temperature of the fluid flowing through said conduit, whereby the readings of the apparatus are rendered substantially independent of the temperature of the fluid.

2. An apparatus for metering the flow of a fluid, comprising in combination, a conduit carrying the flow of the fluid; propeller means arranged in said conduit for actuation by the flow of the fluid; a photoelectric device; a light source illuminating said photoelectric device; a shutter mechanism actuated by said propeller means and interposed between said light source and said photoelectric device so as to illuminate said photoelectric device periodically at a rate proportional to the rate of the flow of the fluid through said conduit; an electronic frequency meter including a one-way electronic relay connected to said photoelectric device so as to yield an electric current output proportional to the frequency of interruptions by said shutter of the light emitted by said light source and falling on said photoelectric device; a device of the direct current ammeter type for metering the current output of said relay; a circuit applying the current output of said relay to said current metering device; and a temperature sensitive resistor inserted in series in said circuit and wound on the outer surface of said conduit so as to have substantially the temperature of the fluid flowing through said conduit, whereby the readings of the apparatus are rendered substantially independent of the temperature of the fluid.

3. An apparatus for metering the flow of a fluid, comprising in combination, a conduit carrying the flow of the fluid; propeller means arranged in said conduit for actuation by the flow of the fluid; a photoelectric device; a light source illuminating said photoelectric device; a shutter mechanism actuated by said propeller means and interposed between said light source and said photoelectric device so as to illuminate said photoelectric device periodically at a rate proportional to the rate of the flow of the fluid through said conduit; an electronic frequency meter including a one-way electronic relay connected to said photoelectric device so as to yield an electric current output proportional to the frequency of interruptions by said shutter of the light emitted by said light source and falling on said photoelectric device; a device of the direct current ammeter type for metering the current output of said relay; a first circuit applying the current output of said relay to said current metering device; a direct voltage source; a second circuit connecting said direct voltage source to said electronic frequency meter; and a temperature sensitive resistor inserted in series in one of said circuits and arranged with respect to said conduit so as to have substantially the temperature of the fluid flowing through said conduit, whereby the readings of the apparatus are rendered substantially independent of the temperature of the fluid.

4. An apparatus for metering the flow of a fluid comprising in combination, a conduit carrying the flow of the fluid; propeller means arranged in said conduit for actuation by the flow of the fluid; a photoelectric device; a light source illuminating said photoelectric device; a shutter mechanism actuated by said propeller means and interposed between said light source and said photoelectric device so as to illuminate said photoelectric device periodically at a rate proportional to the rate of the flow of the fluid through said conduit; an electronic frequency meter including a one-way electronic relay connected to said photoelectric device so as to yield an electric current output proportional to the frequency of interruptions by said shutter of the light emitted by said light source and falling on said photoelectric device; a device of the direct current ammeter type for metering the current output of said relay; a first circuit applying the current output of said relay to said current metering device; a direct voltage source; a second circuit connecting said direct voltage source to said electronic frequency meter; and a temperature sensitive resistor inserted in series in one of said circuits and wound on the outer surface of said conduit so as to have substantially the temperature of the fluid flowing through said conduit, whereby the readings of the apparatus are rendered substantially independent of the temperature of the fluid.

5. An apparatus for metering the flow of a fluid, comprising in combination, a conduit carrying the flow of the fluid; propeller means arranged in said conduit for actuation by the flow of the fluid; a photoelectric device; a light source illuminating said photoelectric device; a shutter mechanism actuated by said propeller means and interposed between said light source and said photoelectric device so as to illuminate said photoelectric device periodically at a rate proportional to the rate of the flow of the fluid through said conduit; an electronic frequency meter including a one-way electronic relay connected to said photoelectric device so as to yield an electric current output proportional to the frequency of interruptions by said shutter of the light emitted by said light source and falling on said photoelectric device; a device of the direct current ammeter type for metering the current output of said relay; a first circuit applying the current output of said relay to said current metering device; a direct voltage source; a second circuit connecting said direct voltage source to said electronic frequency meter; a first temperature sensitive resistor inserted in series in said first circuit; and a second temperature sensitive resistor inserted in series in said second circuit, said resistors being arranged with respect to said conduit so as to have substantially the temperature of the fluid flowing through said conduit, whereby the readings of the apparatus are rendered substantially independent of the temperature of the fluid.

6. An apparatus for metering the flow of a fluid, comprising in combination, a conduit carrying the flow of the fluid; propeller means arranged in said conduit for actuation by the flow of the fluid; a photoelectric device; a light source illuminating said photoelectric device; a shutter mechanism actuated by said propeller means and interposed between said light source and said photoelectric device so as to illuminate said photoelectric device periodically at a rate proportional to the rate of the flow of the fluid through said conduit; an electronic frequency meter including a one-way electronic relay connected to said photoelectric device so as to yield an electric current output proportional to the frequency of interruptions by said shutter of the light emitted by said light source and falling on said photoelectric device; a device of the direct current ammeter type for metering the current output of said relay; a first circuit applying the current output of said relay to said current metering device; a direct voltage source; a second circuit connecting said direct voltage source to said electronic frequency meter; a first temperature sensitive resistor inserted in series in said first circuit; and a second temperature sensitive resistor inserted in series in said second circuit, said resistors being wound on the outer surface of said conduit so as to have substantially the temperature of the fluid flowing through said conduit, whereby the readings of the apparatus are rendered substantially independent of the temperature of the fluid.

TEUNIS VAN OOSTEROM.

REFERENCES CITED

The following references are of record in the file of this patent:

UNITED STATES PATENTS

| Number | Name | Date |
| --- | --- | --- |
| 1,277,464 | Norwood et al. | Sept. 3, 1918 |
| 1,768,553 | Freeman | July 1, 1930 |
| 1,957,681 | Thompson | May 8, 1934 |
| 2,176,502 | Kurth | Oct. 17, 1939 |
| 2,204,463 | Allen | June 11, 1940 |
| 2,209,700 | Mayo et al. | July 30, 1940 |
| 2,406,723 | Hortenau | Aug. 27, 1946 |
| 2,411,613 | Bryant | Nov. 26, 1946 |

FOREIGN PATENTS

| Number | Country | Date |
| --- | --- | --- |
| 186,574 | Germany | June 26, 1907 |